United States Patent [19]

Zajac

[11] Patent Number: 4,505,148

[45] Date of Patent: Mar. 19, 1985

[54] LEAK DETECTION SYSTEM

[75] Inventor: Chester J. Zajac, Litchfield, Conn.

[73] Assignee: Transamerica DeLaval, Inc., Princeton, N.J.

[21] Appl. No.: 525,285

[22] Filed: Aug. 22, 1983

[51] Int. Cl.³ .................... G01M 3/32; G01F 23/10
[52] U.S. Cl. .................... 73/49.2; 73/313; 340/605
[58] Field of Search ............ 73/49.2, 313, 308, 307; 340/605, 623

[56] References Cited

U.S. PATENT DOCUMENTS 3,939,383  2/1976  Alm .......................... 73/49.2 X
4,353,245  10/1982  Nicolai ..................... 73/49.2
4,361,835  11/1982  Nagy ........................ 73/313 X Primary Examiner—Jerry W. Myracle
Assistant Examiner—Joseph W. Roskos
Attorney, Agent, or Firm—Hopgood, Calimafde, Kalil, Blaustein & Judlowe

[57] ABSTRACT

Leakage from a gasoline storage tank or other receptacle is detected by differentiating the output from a liquid-level monitoring transmitter with stepped voltage output and applying the differentiated transmitter signal through an amplifier to a latch controlled relay for activating an alarm. An interlock circuit is provided for deenergizing the detector part of the system whenever the contents of the tank is being altered intentionally.

12 Claims, 2 Drawing Figures

LEAK DETECTION SYSTEM

BACKGROUND OF THE INVENTION

The present invention relates to leak detectors, and, more particularly, to apparatus for detecting leaks occurring in liquid receptacles where the receptacles are not accessible for direct observation.

While not limited thereto, the invention is well suited to and will be described with reference to leak detection from petro chemical tanks. A problem that commonly occurs in places where petro chemicals such as gasoline are stored, e.g., gas stations, is that leaks develop in the tanks and such condition cannot be detected until excessive leakage has occurred. This is due to the fact that liquid level in the tanks varies at a significant rate in response to intentional discharge of gasoline and masks the slow level change due to leakage.

Aside from the old fashioned dip stick or measuring rod there are various known devices for providing readout of tank contents. Capacitive probes have been used as well as floats positioning adjustable potentiometers. However, these devices provide continuous readings that vary as a result of normal pumping at a significantly greater rate than any variation due to leakage. Also, unless successive readings can be taken over an extended period of time without intervening normal discharge of the tank contents, the difference due to a slow leak will be unobservable.

One other type of float actuated liquid-level monitoring device is known wherein the float carries a permanent magnet and successively actuates the individual magnetic reed switches in an array of such switches. The switches are connected to respective taps on a resistance network in a potentiometer-like circuit operative to switch taps along the resistance, stepwise, providing a stepped voltage output when a voltage source is connected across the resistance network. It is perception of a characteristic of this last mentioned type of level monitoring device that has led to the present invention.

SUMMARY OF THE INVENTION

In accordance with the present invention there is provided a leak detection system for providing an indication of fluid leakage from a receptacle in which liquid level is monitored by a float controlled transmitter having a stepped voltage output in response to changes in liquid level, said system comprising in combination means for differentiating a voltage signal, said means having an input for coupling to an electrical output of said transmitter and having an output for providing a voltage pulse upon occurrence of a transition in said stepped voltage output, and means coupled to said output of the differentiating means responsive to said voltage pulse for providing an indication of leakage.

BRIEF DESCRIPTION OF THE DRAWINGS

The invention will be better understood after reading the following detailed description of the presently preferred embodiment thereof with reference to the appended drawings in which.

The same reference numerals are used throughout the drawings to designate the same or similar parts.

DETAILED DESCRIPTION OF THE PRESENTLY PREFERRED EMBODIMENT

Figure 1:
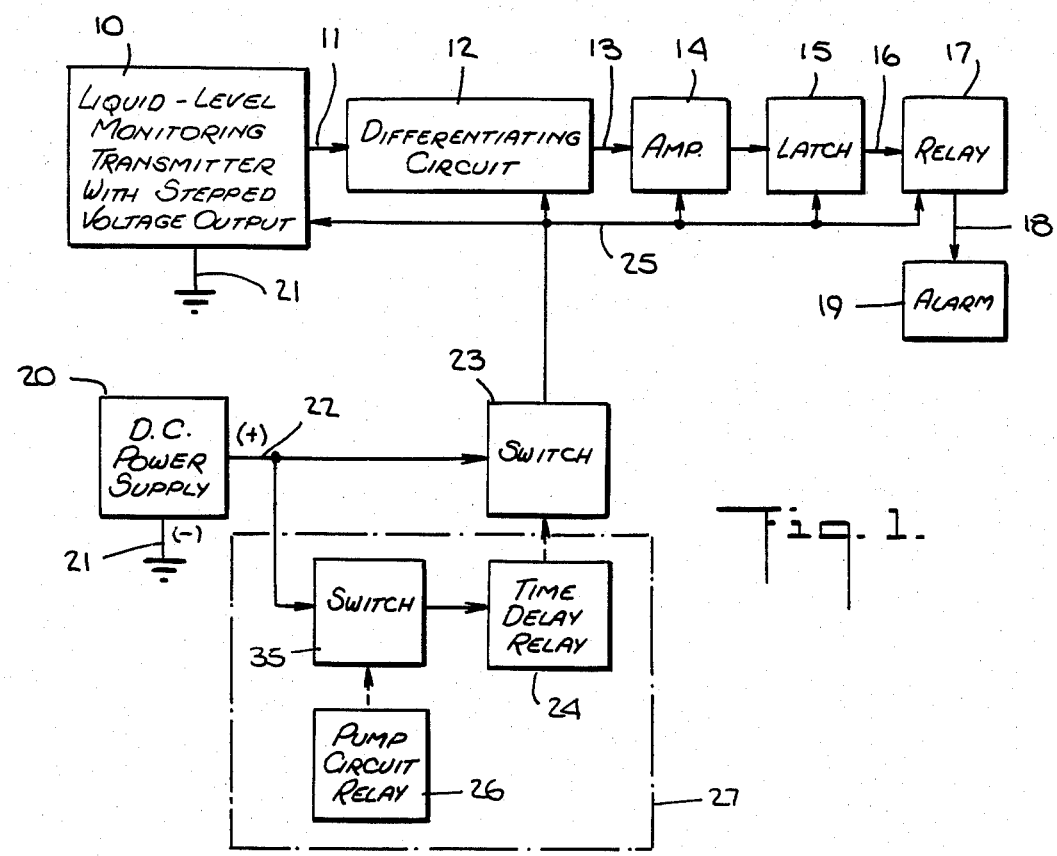
FIG. 1 is a block circuit diagram of a system embodying the present invention.

Referring now to the drawings, there is shown a liquid-level monitoring transmitter with stepped voltage output 10 having a signal output 11 coupled to the input of a differentiating circuit 12 whose output 13 is coupled through an amplifier 14 to a latch circuit 15 having an output 16 coupled to control a relay 17. The output 18 of the relay 17 is connected to an alarm device 19.

Power for operating the leak detection system components 10 through 19 is supplied by a DC power supply 20 shown with its negative terminal connected to ground at 21 and its positive terminal connected to an output lead 22. The lead 22 is connected through a switch device 23 under the control of a time delay relay 24 to a bus 25 from which connections are made to each of the components including the liquid-level monitoring transmitter 10. A separate connection from lead 22 is provided through another switch 35 to the time delay relay 24, the switch 35 being under the control of a pump circuit relay 26.

In a typical installation of the subject detection system the pump circuit relay 26 can, for example, have its actuating coil connected in parallel with the dispensing pump at the gas station. Switches 23 and 35 can be relay contacts under the control of the respective relays 24 and 26. When the pump circuit relay 26 is energized due to operation of its associated gas pump, the switch 35 should be in the open position. Upon deactivation of the gas pump and the pump circuit relay 26 the switch 35 should close applying power from the source 20 to the time delay relay 24. After a suitable delay sufficient to enable the sloshing in the tank to cease, time delay relay 24 will close its normally open contacts serving as switch 23 to apply power from source 20 to the bus 25 thereby activating the leakage detection portion of the circuit.

When the leakage detection portion of the circuit is activated any negative transition in the output signal at lead 11 from the transmitter 10 will be differentiated by the circuit 12 to produce a pulse at its output 3. This pulse will be amplified by the amplifier 14 and will trigger the latch 15 which can be a suitably biased SCR device. Upon rendering conductive the latch 15 it will actuate over output 16 the relay 17 which, in turn, will energize the alarm 19. The circuit is reset upon subsequent energization of the pump circuit relay 26 or by interruption of the DC power supplied to bus 25 through the intermediary of a manual switch, not shown.

When the subject system is used to detect leakage in underground tanks or the like of a gasoline station, the system would normally be turned off during normal business hours when pump operation is frequent. Typically, it could be turned on at night such that if leakage were to cause a step in output from the transmitter 10 the alarm 19 would be activated and would alert operating personnel before the station was placed into operation the following morning. Under such circumstances the pump circuit relay and time delay relay components shown within the phantom box 27 may be unnecessary and omitted. In such case the switch 23 could be a manual switch for determining when the leak detector is to be operative.

Figure 2:
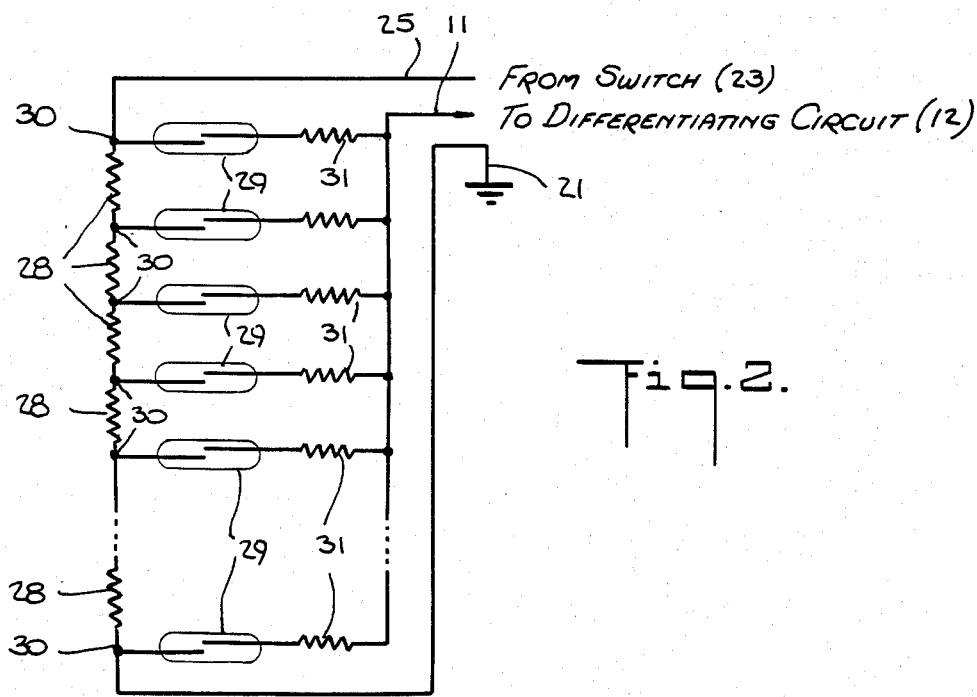
FIG. 2 is a simplified schematic diagram for explaining the operation of a liquid-level monitoring transmitter with stepped voltage output.

Referring to FIG. 2 there is shown in schematic form the circuit of a liquid-level monitoring transmitter adapted to provide a stepped voltage output and to function as the transmitter 10 in the circuit of FIG. 1. As shown, there is a series arrangement of resistors 28 connected between the bus 25 and the ground connection 21. A series of individual magnetic reed switches 29 are connected from respective taps 30 along the resistor network 28 through individual resistors 31 to the output lead 11. Various resolution sensitivities can be obtained in known manner depending upon whether one or more of the reed switches are closed at the same time and on the inter-switch spacing throughout the transmitter array.

In a typical known transmitter of the type illustrated in FIG. 2, the output voltage varies in 30 millivolt steps as the float (not shown) moves up and down the length of the transmitter.

Although for convenience the invention has been described with reference to detection of leaks in tanks at a gasoline station, it would be apparent to those skilled in the art that the detection system can be used to detect leaks in any storage tank facility where there are significant intervals during which the contents of the receptacle are not intentionally altered.

Having described the invention with reference to a presently preferred embodiment thereof, it should be understood by those skilled in the art that various changes in construction may be incorporated without departing from the true spirit of the invention as defined in the appended claims.

What is claimed is:

1. A leak detection system for providing an indication of fluid leakage from a receptacle in which liquid level is monitored by a float controlled transmitter having a stepped voltage output in response to changes in liquid level, said system comprising in combination means for differentiating a voltage signal, said means having an input for coupling to an electrical output of said transmitter and having an output for providing a voltage pulse upon occurrence of a transition in said stepped voltage output, and means coupled to said output of the differentiating means responsive to said voltage pulse for providing an indication of leakage.

2. A leak detection system according to claim 1, characterized in that said means for providing an indication of leakage comprises a voltage responsive latch controlling a relay device.

3. A leak detection system according to claim 1, characterized in that additional means are provided for deactivating said system whenever liquid is being intentionally introduced into or discharged from said receptacle.

4. A leak detection system according to claim 3, characterized in that said additional means comprises a power source for said system, relay means for disconnecting said power source from said system, and means for coupling said relay means to fluid transfer control means responsive to operation of the latter for disconnecting said power source.

5. A leak detection system according to claim 4, wherein the receptacle is a fuel tank supplying dispensing pumps, characterized in that said relay means includes a time delay relay, and said means for coupling said relay means to fluid transfer control means comprises a second relay with means for coupling it responsively to the operating circuit for a dispensing pump, said second relay being coupled to said time delay relay for energizing the latter whenever said dispensing pump is inactive whereby operation of said leak detection system is delayed for an interval of time after cessation of operation of said dispensing pump.

6. A leak detection system according to claim 5, characterized in that said means for providing an indication of leakage comprises a voltage responsive latch controlling a relay device.

7. A leak detection system for providing an indication of fluid leakage from a receptacle comprising in combination a liquid-level monitoring transmitter with stepped voltage output responsive to movement of a float with changes in liquid level, said transmitter including means for mounting said transmitter within said receptacle, means coupled to an electrical output of said transmitter for differentiating said stepped voltage output to provide a voltage pulse upon occurrence of a transition in said stepped voltage output, and means responsive to an output from said differentiating means for providing an indication of leakage.

8. A leak detection system according to claim 7, characterized in that said means for providing an indication of leakage comprises a voltage responsive latch controlling a relay device.

9. A leak detection system according to claim 7, characterized in that additional means are provided for deactivating said system whenever liquid is being intentionally introduced into or discharged from said receptacle.

10. A leak detection system according to claim 9, characterized in that said additional means comprises a power source for said system, relay means for disconnecting said power source from said system, and means for coupling said relay means to fluid transfer control means responsive to operation of the latter for disconnecting said power source.

11. A leak detection system according to claim 10, wherein the receptacle is a fuel tank supplying dispensing pumps, characterized in that said relay means includes a time delay relay, and said means for coupling said relay means to fluid transfer control means comprises a second relay with means for coupling it responsively to the operating circuit for a dispensing pump, said second relay being coupled to said time delay relay for energizing the latter whenever said dispensing pump is inactive whereby operation of said leak detection system is delayed for an interval of time after cessation of operation of said dispensing pump.

12. A leak detection system according to claim 11, characterized in that said means for providing an indication of leakage comprises a voltage responsive latch controlling a relay device.

* * * * *